(12) United States Patent (10) Patent No.: US 7,453,523 B2
Yamauchi (45) Date of Patent: Nov. 18, 2008

(54) NOISE REDUCTION APPARATUS

(75) Inventor: Himio Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 315 days.

(21) Appl. No.: 11/107,883

(22) Filed: Apr. 18, 2005

(65) Prior Publication Data

US 2005/0265627 A1 Dec. 1, 2005

(30) Foreign Application Priority Data

May 31, 2004 (JP) .............................. 2004-161756

(51) Int. Cl.
*H04N 5/21* (2006.01)
(52) U.S. Cl. ..................... 348/607; 348/619; 348/620; 348/622
(58) Field of Classification Search ................ 348/607, 348/619, 620, 616, 617–618, 621, 624–625, 348/909, 630, 606, 622; 382/260; *H04N 5/21*
See application file for complete search history.

(56) References Cited

U.S. PATENT DOCUMENTS

| 4,485,403 | A | * | 11/1984 | Illetschko | 348/607 |
| 4,639,784 | A | * | 1/1987 | Fling | 348/620 |
| 5,025,316 | A | * | 6/1991 | Darby | 348/620 |
| 5,278,638 | A | * | 1/1994 | Nakada et al. | 348/607 |
| 5,880,791 | A | * | 3/1999 | De Haan et al. | 348/607 |

FOREIGN PATENT DOCUMENTS

| CN | 1259823 | 7/2000 |
| JP | 03-240393 A | 10/1991 |
| JP | 06-062283 A | 3/1994 |
| JP | 9-23357 | 1/1997 |

OTHER PUBLICATIONS

Peoples Republic Of China Office Action dated Dec. 22, 2006 for Appln. No. 200510069047.4.

\* cited by examiner

*Primary Examiner*—Trang U Tran
(74) *Attorney, Agent, or Firm*—Pillsbury Winthrop Shaw Pittman, LLP

(57) ABSTRACT

A noise reduction apparatus includes a subtracter receives a motion video signal and finds a difference signal indicative of a difference from a motion video signal preceding by 1 frame and from which noise is removed, a first multiplier executes multiplication so as to increase/decrease the difference signal corresponding to the motion video signal, a second multiplier detects an mount of motion of the motion video signal and executes multiplication so as to increase/decrease the difference signal from the subtracter in accordance with the amount of motion, an arithmetic unit subjects the increased/decreased difference signal from the second multiplier to addition/subtraction with the motion video signal, and a memory unit stores the noise-free motion video signal in a memory area and supplies to the subtracter as a 1-frame-preceding noise-free motion video signal.

8 Claims, 5 Drawing Sheets

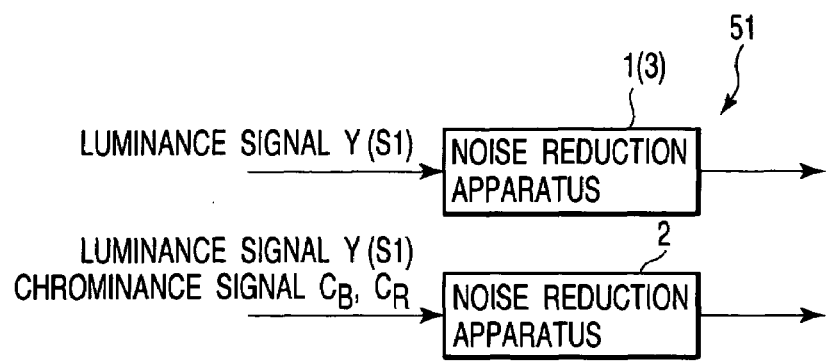
F I G. 4
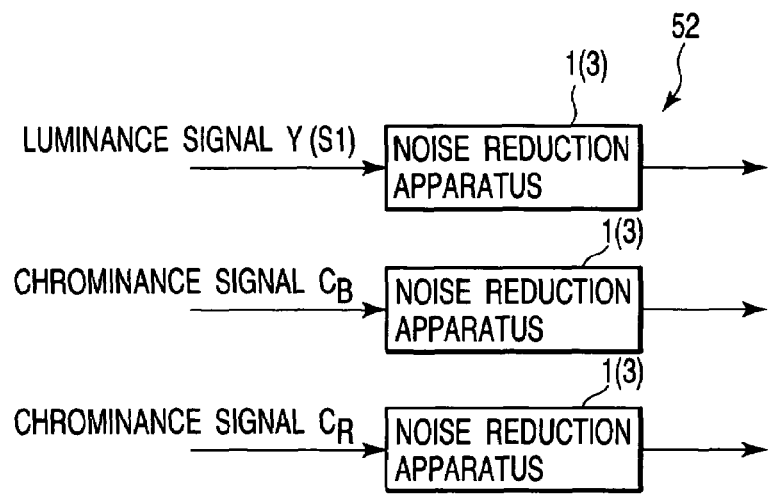
F I G. 5
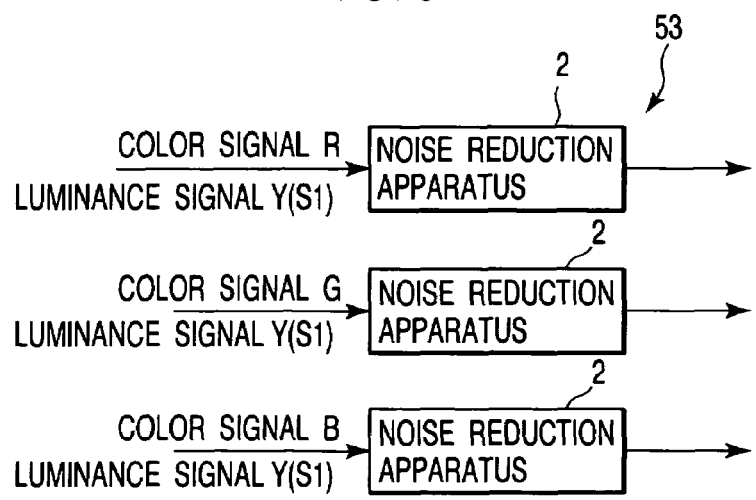
F I G. 6

NOISE REDUCTION APPARATUS

CROSS-REFERENCE TO RELATED APPLICATIONS

This application is based upon and claims the benefit of priority from prior Japanese Patent Application No. 2004-161756, filed May 31, 2004, the entire contents of which are incorporated herein by reference.

BACKGROUND OF THE INVENTION

1. Field of the Invention

The present invention relates generally to a noise reduction apparatus for a motion video signal, and more particularly to a noise reduction apparatus that controls the degree of noise reduction in accordance with a value (brightness) of a motion video signal.

2. Description of the Related Art

In recent years, motion video processing apparatuses have remarkably been developed and widely used, so there is a demand for high reliability. An example of such motion video processing apparatuses is a motion video noise reduction apparatus. A frame recursive noise reduction apparatus, for instance, is known as the motion video noise reduction apparatus.

In the frame recursive noise reduction apparatus, an output image that precedes by 1 frame (i.e. 1-frame-preceding output image) and a current input image are subjected to subtraction, thereby obtaining an inter-frame difference. The inter-frame difference is multiplied by a certain coefficient, and the resultant is added/subtracted to/from the current input image. The coefficient is calculated on the basis of motion detection information that is obtained from the inter-frame difference. As the motion is greater, the coefficient is set at a smaller value. Thereby, afterimage is reduced.

Patent Document 1 (Jpn. Pat. Appln. KOKAI Publication No. 6-62283) and Patent Document 2 (Jpn. Pat. Appln. KOKAI Publication No. 3-240393) disclose noise reduction apparatuses wherein motion of a real motion video component that includes no noise is also detected, and if the motion of the real motion video component is detected, a noise reduction process is temporarily suppressed or suspended. Thereby, afterimage, which is a side effect of the noise reduction process, is prevented from occurring on the screen.

In the prior-art noise reduction apparatus, there is the following problem. Noise is conspicuous, in particular, on a dark part of an image. Thus, if the dark part is subjected to a high degree of noise reduction in the noise reduction process in accordance with a difference signal, afterimage becomes conspicuous, in particular, on a light part of the image on the screen, which is a side effect of the noise reduction process. On the other hand, there is such a technical background that noise on a light part of an image is not conspicuous even if it is not removed.

Hence, it is effective to execute a noise reduction process in accordance with the brightness of motion video, for example, by increasing the degree of noise reduction for a dark part of an image and decreasing the degree of noise reduction or suspending noise reduction for a light part of the image. However, in the above-described prior-art apparatus, there is problem that noise reduction cannot be executed in consideration of the brightness (luminance, etc.) of an image at each point in time.

BRIEF SUMMARY OF THE INVENTION

According to an embodiment of the present invention, there is provided a noise reduction apparatus comprising: a subtracter that receives an input motion video signal and a motion video signal, which precedes by 1 frame and from which noise is removed, and that obtains a difference signal indicative of a difference between the signals; a motion detection circuit that detects an amount of motion of the motion video signal on the basis of the difference signal from the subtracter, and outputs a coefficient varying in accordance with the amount of motion; a multiplier that increases/decreases the difference signal in accordance with the coefficient from the motion detection circuit and a value of the motion video signal that is input to the subtracter, and outputs a resultant difference signal; an arithmetic unit that subjects the difference signal output from the multiplier to addition/subtraction with the input motion video signal, thereby outputting a motion video signal, from which a noise component in the input motion video signal is removed; and a memory unit that receives the noise-free motion video signal from the arithmetic unit, and outputs a motion video signal that delays by 1 frame to the subtracter.

BRIEF DESCRIPTION OF THE SEVERAL VIEWS OF THE DRAWING

FIG. 4 is a block diagram that shows an example of the structure of noise reduction apparatuses for a color signal and a luminance signal according to the present invention;

FIG. 5 is a block diagram that shows another example of the structure of noise reduction apparatuses for chrominance signals and a luminance signal according to the present invention;

FIG. 6 is a block diagram that shows an example of the structure of noise reduction apparatuses for three color signals according to the present invention.

DETAILED DESCRIPTION OF THE INVENTION

Embodiments of the present invention will now be described in detail with reference to the accompanying drawings.

Noise Reduction Apparatus According to First Embodiment of Present Invention A noise reduction apparatus according to a first embodiment of the present invention is a noise reduction apparatus that controls a noise reduction effect in accordance with a video signal level (image brightness).

Figure 1:
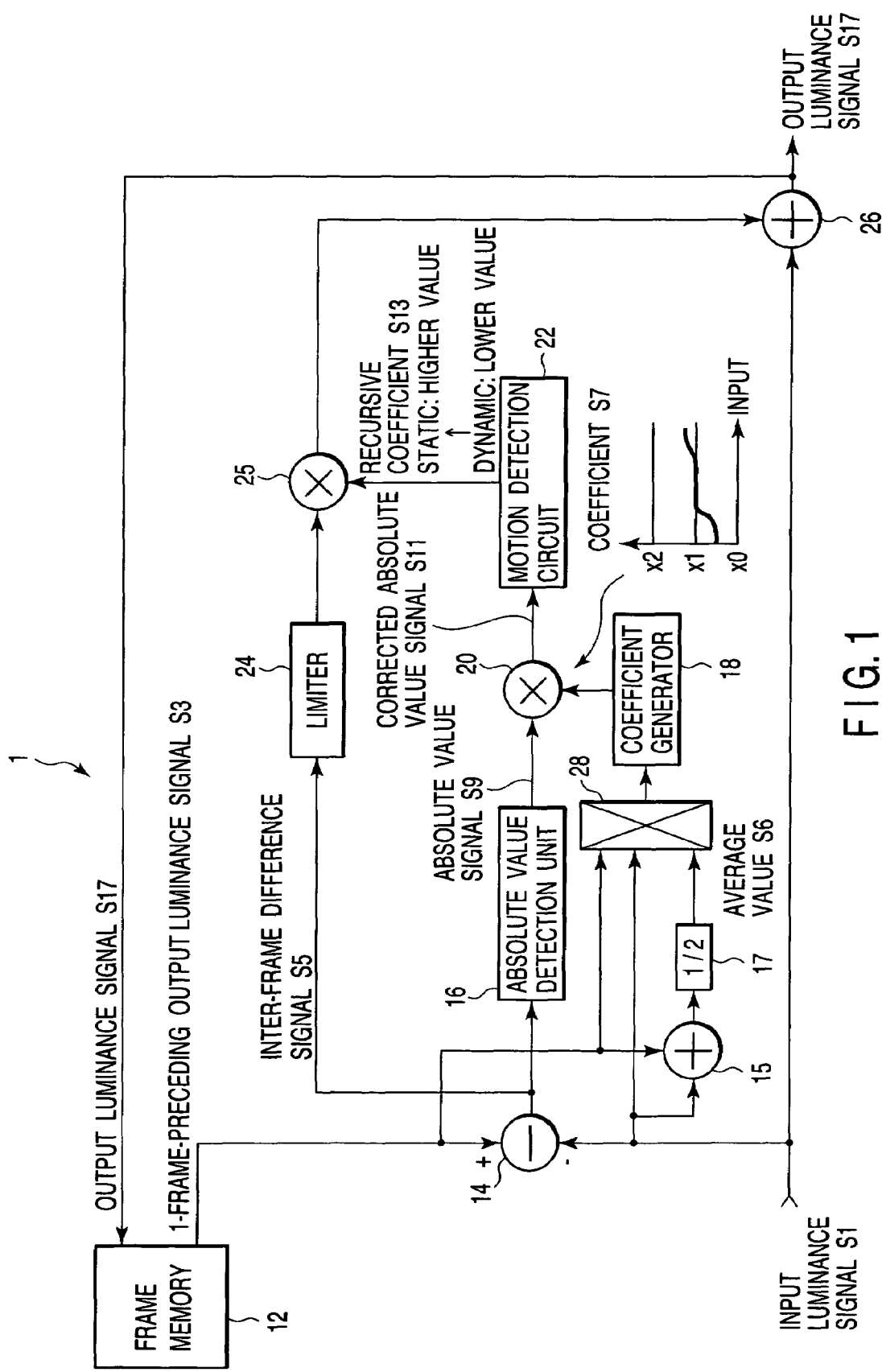
FIG. 1 is a block diagram that shows an example of the structure of a noise reduction apparatus according to an embodiment of the present invention.

To begin with, referring to FIG. 1, an example of a noise reduction apparatus according to an embodiment of the invention is described in detail. FIG. 1 is a block diagram that shows an example of the structure of a noise reduction apparatus according to an embodiment of the present invention. This is an example of a noise reduction apparatus for a luminance signal, which is an instance of a motion video signal.

A noise reduction apparatus 1 shown in FIG. 1 includes a subtracter 14 and an adder 26, which receive a motion video signal, for example, a luminance signal S1. The noise reduction apparatus 1 further includes a frame memory 12 that stores an output luminance signal S17, which is an output signal from the adder 26 (i.e. a motion video signal from which noise has been removed).

An output signal from the frame memory 12 is an output luminance signal (S3) that precedes the output luminance signal S17 by 1 frame. The output signal from the frame memory 12 is delivered to the subtracter 14, and the subtracter 14 outputs an inter-frame difference signal S5. On the output stage of the subtracter 14, there are provided a limiter 24 that limits an amplitude of the inter-frame difference signal S5 to a predetermined value and outputs a signal with the limited amplitude to a subsequent stage, and a multiplier 25 that receives the output from the limiter 24.

The noise reduction apparatus 1 further includes an absolute value detection unit 16 that receives the inter-frame difference signal S5 from the subtracter 14 and outputs an absolute value signal S9 that represents the absolute value of the inter-frame difference signal S5, and a multiplier 20 that receives the inter-frame difference absolute value signal S9 from the absolute value detection unit 16. In addition, the noise reduction apparatus 1 includes an adder 15 that receives the 1-frame-preceding output luminance signal S3 from the frame memory 12 and the input luminance signal S1 and outputs an addition result, and an averaging unit 17 that outputs an average value of the addition result.

The noise reduction apparatus 1 further includes a selector 28 that receives three signals, i.e. the 1-frame-preceding output luminance signal S3, the input luminance signal S1 and the average value signal from the averaging unit 17, and selects and outputs one of the three signals (or two or more of the three signals, or an average value of the two or more of the three signals, as will be described later). The selector 28 selects signal information corresponding to image brightness in order to control the noise reduction process, and outputs the selected signal information to a subsequent stage. That is, the selector 28 selects one of the plural signals on the basis of a predetermined standard for selection, and outputs the selected signal under a control of a control unit (not shown), where necessary. However, the noise reduction apparatus 1 is not always need selector 28.

Besides, the noise reduction apparatus 1 includes a coefficient generator 18 that receives a signal corresponding to image brightness from the selector 28, generates a corresponding coefficient, and delivers the coefficient to the multiplier 20. The multiplier 20 executes a multiplication process on the basis of the delivered coefficient, and outputs a corrected inter-frame difference absolute value signal S11. The corrected inter-frame difference absolute value signal S11 is received by a motion detection circuit 22. The motion detection circuit 22 detects a motion of video of a normal motion video signal on the basis of the input signal, and generates a recursive coefficient S13 that reduces the degree of noise reduction in the noise reduction process in accordance with the detected motion. The recursive coefficient S13 is delivered to the multiplier 25.

Operation

The noise reduction apparatus 1 with the above-described structure executes a proper noise reduction process in accordance with image brightness (luminance, etc.) and the degree of motion of a motion video signal, as is described below. Mainly by the functions of the multiplier 20 and multiplier 25, the value of the inter-frame difference signal S5 from the subtracter 14 is adjusted. If an image is dark, the degree of noise reduction in the noise reduction process is increased. If an image is light, the degree of noise reduction in the noise reduction process is decreased. If the amount of motion of the motion video signal is a predetermined value or more, the motion detection circuit 22 and multiplier 25 suspend the noise reduction process, or decrease the degree of noise reduction in the noise reduction process in proportion (including non-linear case) to the amount of motion of the motion video signal, thereby reducing afterimage on the screen.

Thus, with respect to a light part of an image, the noise reduction process is suspended or attenuated. On the other hand, with respect to a dark part of the image, the noise reduction process is intensified. Thereby, a high-quality motion video screen, which is generally free from noise and has an inconspicuous afterimage, can be obtained.

To be more specific, the input luminance signal S1 and the 1-frame-preceding output luminance signal S3, which is read out of the frame memory 12, are input to the subtracter 14, and the inter-frame difference signal S5 is obtained. The amplitude of the inter-frame difference signal S5 is limited to an arbitrary value by the limiter 24, and the resultant inter-frame difference signal S5 is multiplied by the recursive coefficient S13 in the multiplier 25.

The recursive coefficient S13 is a coefficient that includes an image brightness component and a motion component of motion video. If the brightness of the image increases, the value of the coefficient S7 that is generated by the coefficient generator 18 increases. Accordingly, the value of the corrected absolute value signal S11 increases. Consequently, the value of the recursive coefficient S13 decreases. Hence, the multiplier 25 decreases the value of the difference signal S5 that is output from the limiter 24, thereby decreasing the degree of noise reduction (i.e. attenuating or stopping noise reduction) in the noise reduction process that is executed in the arithmetic unit 26.

Further, the input luminance signal S1 is subjected to addition/subtraction in the arithmetic unit 26 with the difference signal S5 from the multiplier 25. Thus, noise in the motion video signal is removed. The arithmetic unit 26 executes the subtraction or addition process on the basis of the sign (+ or −) of the difference signal from the multiplier 25, thereby removing noise.

On the other hand, the input luminance signal S1, the 1-frame-preceding output luminance signal S3 and the average value signal S6 that is obtained by averaging both signals S1 and S3 are delivered to the selector 28. The selector 28 selects one of them and feeds it to the coefficient generator 18. The coefficient generator 18 outputs the coefficient S7 that corresponds to the level of the selected signal. The multiplier 20 multiplies the inter-frame difference absolute value signal S9 by the coefficient. The inter-frame difference absolute value signal S11 that is thus corrected is input to the motion detection circuit 22. For example, the coefficient generator 18 generates a value that is less than 1 when the input signal level is less than a predetermined range, and generates a value that is greater than 1 when the input signal level is greater than the predetermined range. In this case, if the luminance signal level is low, the corrected absolute value signal S11 has a smaller value than the absolute value signal S9. If the luminance signal level is high, the corrected absolute value signal S11 has a greater value than the absolute value signal S9.

The motion detection circuit 22 decreases the value of the recursive coefficient S13 as the value of the corrected inter-frame difference absolute value signal S11 becomes greater, thereby weakening the noise reduction effect so as to reduce afterimage. Specifically, if the luminance signal level is low, the recursive coefficient S13 becomes greater than usual. If the luminance signal level is high, the recursive coefficient S13 becomes less than usual. In other words, the noise reduction effect is increased with respect to a dark part where noise tends to be conspicuous, and the noise reduction effect is weakened with respect to a light part where noise is inconspicuous. Thereby, afterimage is reduced.

As has been described above, according to the present invention, in the noise reduction process, even when the level of noise in the motion video signal remains unchanged, the noise reduction effect is controlled in accordance with the motion video signal level (image brightness), taking into account the fact that the degree of conspicuousness of noise varies depending on the motion video signal level (image brightness). Thereby, a motion video signal having a higher quality than in the prior art can be obtained.

In this example, the corrected inter-frame difference absolute value signal S11 is obtained using the coefficient generator 18 and multiplier 20. The present embodiment, however, is not limited to this configuration. For example, the functions of the coefficient generator 18 and multiplier 20 (additionally, the functions of the motion detection circuit 22 and multiplier 25) may be replaced with a CPU and a lookup table that is realized by, e.g. a RAM. Thereby, it becomes possible to realize a noise reduction process that is applicable to a still finer motion video signal level (image brightness).

Noise Reduction Apparatus According to Second Embodiment

In a noise reduction apparatus according to a second embodiment of the present invention, when a coefficient corresponding to a video signal level (image brightness) is to be generated, the coefficient is determined on the basis of a luminance signal and a color signal. Thereby, the noise reduction effect is controlled.

Figure 2:
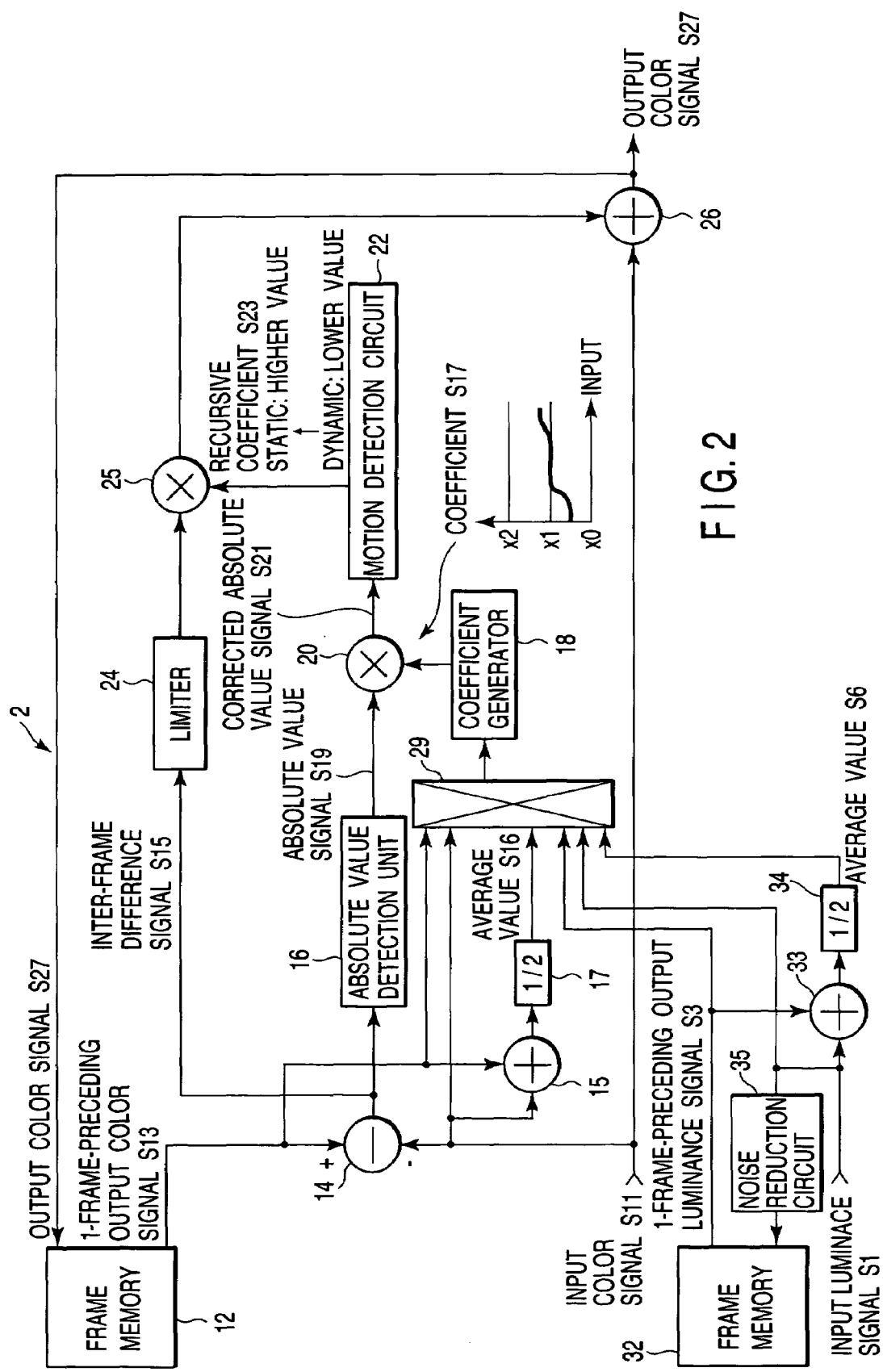
FIG. 2 is a block diagram that shows an example of the structure of a noise reduction apparatus according to a second embodiment of the present invention.

FIG. 2 is a block diagram that shows an example of the structure of a noise reduction apparatus according to an embodiment of the invention, wherein both a color signal and a luminance signal are taken into account. In FIG. 2, the main components are common to those of the noise reduction apparatus shown in FIG. 1. Only different parts are described. As is shown in FIG. 2, the noise reduction apparatus 2 of the second embodiment receives an input color signal S11 at an input section thereof. Further, a second input section receives an input luminance signal S1.

In addition, unlike the noise reduction apparatus 1 of the first embodiment shown in FIG. 1, the selector 29 receives a color signal S11, a 1-frame-preceding color signal S13 from which noise is removed, an average value signal S16 of the signals S11 and S13, an input luminance signal S1, a 1-frame-preceding luminance signal S3 from which noise is removed, and an average value signal S6 of the signals S1 and S3. A signal, which is found to have a high noise reduction effect by, e.g. measurement by the designer, is selected from those signals that are delivered to the selector 29. Alternatively, an optimal signal may be determined and selected at each point in time by a control unit (not shown).

In addition to the structure of the noise reduction apparatus 2 shown in FIG. 2, there are provided a noise reduction circuit 35 and a frame memory 32, which are needed to obtain a noise-free luminance signal S3 that precedes the output signal from the noise reduction circuit 35 by 1 frame, and an adder 33 and an averaging unit 34, which are needed to obtain an average value signal S6 that represents an average value of the two successive signals, either of which precedes or follows the other by 1 frame.

The selector 29 and coefficient generator 18 may be set so as to select not one of, but a plurality of, the color signal S11, 1-frame-preceding noise-free color signal S13, average value signal S16 of the signals S11 and S13, input luminance signal S1, 1-frame-preceding noise-free luminance signal S3 and average value signal S6 of the signals S1 and S3. For example, the coefficient generator 18 may determine the coefficient, simply on the basis of the color signal S11 and luminance signal S1. If a good result can be obtained by freely combining these six signals or by adding some other signals, where necessary, for arithmetic operations, this measure may preferably be adopted. However, in this case, the selector 29 is not always be needed.

In this example, the corrected inter-frame difference absolute value signal S21 is obtained using the coefficient generator 18 and multiplier 20. The present embodiment, however, is not limited to this configuration. For example, like the first embodiment, the functions of the coefficient generator 18 and multiplier 20 (additionally, the functions of the motion detection circuit 22 and multiplier 25) may be replaced with a CPU and a lookup table that is realized by, e.g. a RAM. Thereby, it becomes possible to realize a noise reduction process that is applicable to a still finer motion video signal level (image brightness).

Noise Reduction Apparatus According to Third Embodiment

Figure 3:
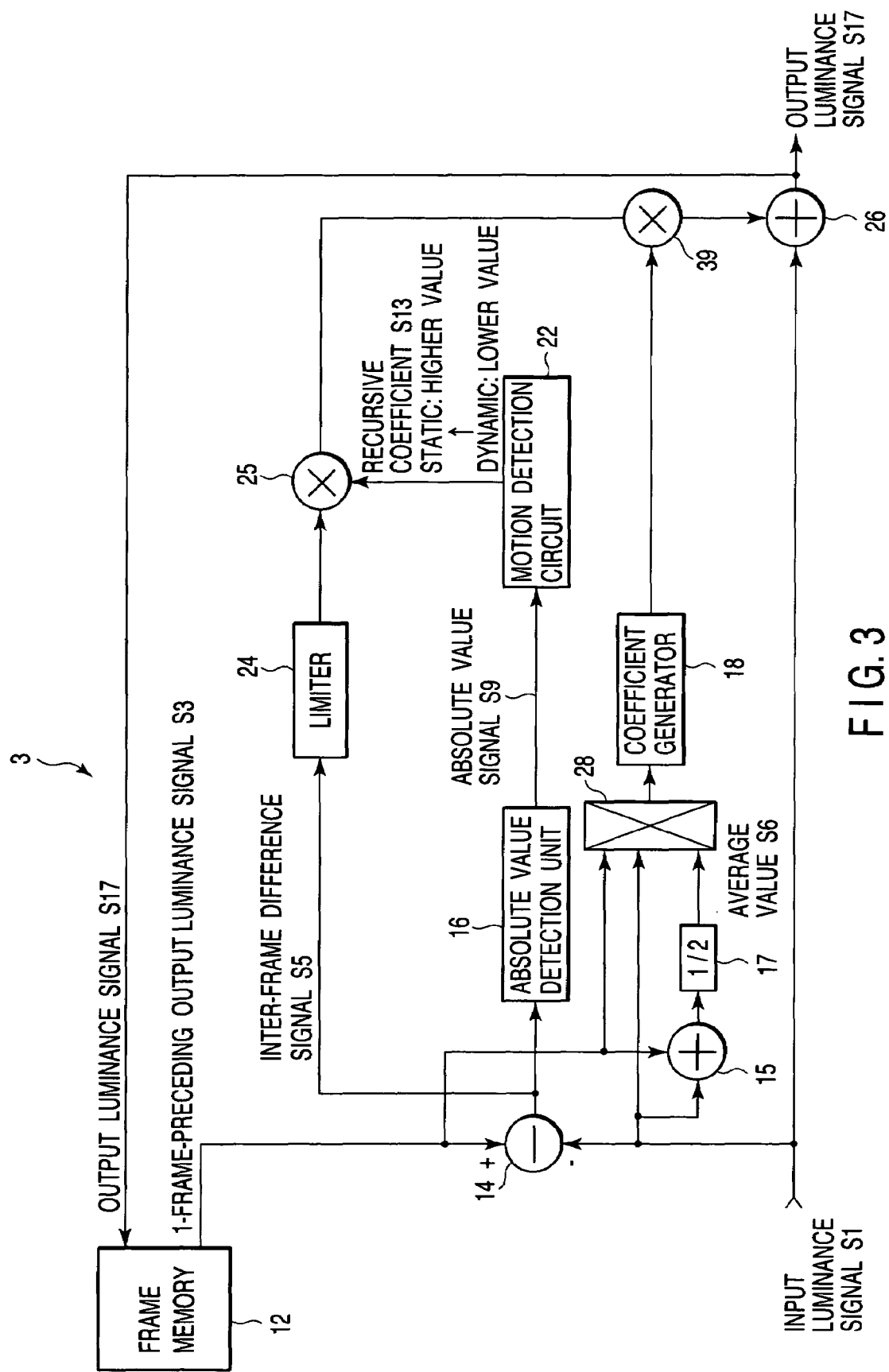
FIG. 3 is a block diagram that shows an example of the structure of a noise reduction apparatus according to a third embodiment of the present invention.

FIG. 3 is a block diagram that shows an example of the structure of a noise reduction apparatus according to an embodiment of the invention.

As is shown in FIG. 3, the main components of a noise reduction apparatus 3 according to a third embodiment of the invention are common to those of the noise reduction apparatus 1 shown in FIG. 1. However, an output of the coefficient generator 18 is delivered to a multiplier 39 that is provided at an output of the multiplier 25 that multiplies the difference signal in accordance with motion detection. An ultimate difference signal is directly controlled by a coefficient that corresponds to the motion video signal level (image brightness). Thereby, the responsivity to the video signal level can be enhanced, and an efficient noise reduction process corresponding to the video signal level can be executed.

Noise Reduction Apparatus According to Fourth Embodiment

A noise reduction apparatus according to a fourth embodiment of the present invention includes a plurality of the above-described noise reduction apparatuses, which process, for example, a luminance signal Y and a chrominance signal $C_B$, $C_R$, respectively. FIG. 4 is a block diagram that shows an example of the configuration in a case where a color signal and a luminance signal are processed by parallel noise reduction apparatuses. FIG. 5 is a block diagram that shows an example of the configuration in a case where chrominance signals and a luminance signal are processed by three noise reduction apparatuses. FIG. 6 is a block diagram that shows an example of the configuration in a case where three color signals are processed by three noise reduction apparatuses.

A noise reduction apparatus 51 shown in FIG. 4 includes two noise reduction apparatuses. Using the noise reduction apparatus 1 (or 3) shown in FIG. 1 or 3, noise reduction for the luminance signal Y is executed. Similarly, using the noise reduction apparatus 2 shown in FIG. 2, noise reduction for the chrominance signals $C_B$ and $C_R$ is executed. Here, it is possible that in the noise reduction apparatus 51, noise reduction 35 and frame memory 32 can be omitted and the signal S3 can be supplied from the apparatus 1 or 3. Thus, the two noise reduction apparatuses are used to realize the noise reduction apparatus that executes noise reduction for the luminance signal Y and chrominance signals $C_B$ and $C_R$ in accordance with the video signal level (image brightness).

In FIG. 5, using the noise reduction apparatus 1 (or 3) shown in FIG. 1 or 3, noise reduction for the luminance signal Y is executed. Similarly, using the noise reduction apparatus 3 shown in FIG. 3, noise reduction for the chrominance signals $C_B$ and $C_R$ is executed. Thus, the three noise reduction apparatuses are used to realize the noise reduction apparatus that executes noise reduction for the luminance signal Y and chrominance signals $C_B$ and $C_R$ in accordance with the video signal level (image brightness).

In FIG. 6, the noise reduction apparatuses 2 shown in FIG. 2 are used to execute noise reduction for a color signal R, a color signal G and a color signal B. On the other hand, three of apparatus 2 can use a noise reduction 35 and frame memory 32 in common.

Noise Reduction Apparatus with Image Display According to Fifth Embodiment

Figure 7:
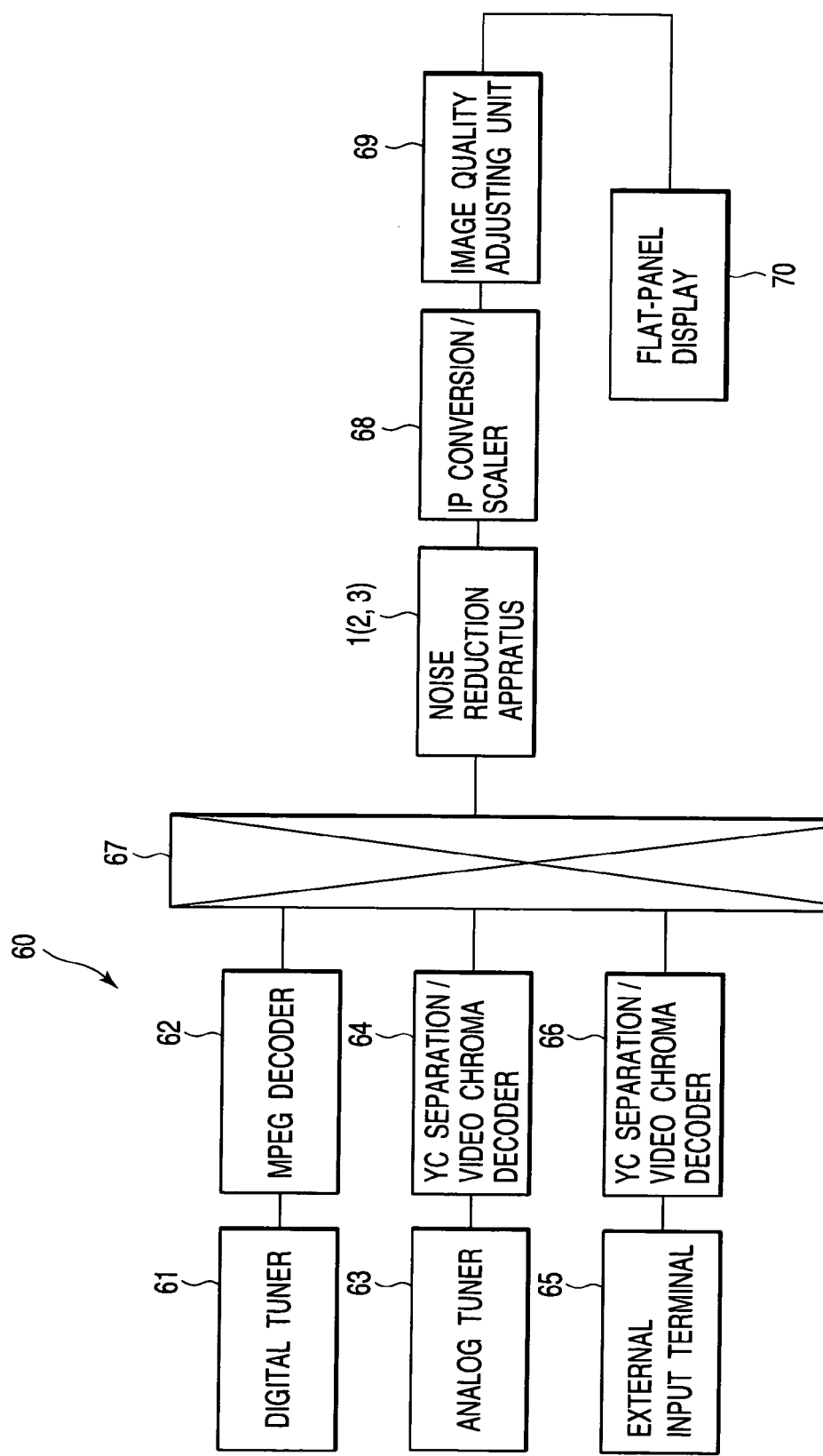
FIG. 7 is a block diagram that shows an example of a noise reduction apparatus with an image display unit, to which the noise reduction apparatus of the present invention is applied.

A fifth embodiment of the present invention provides a noise reduction apparatus with an image display unit, to which the above-described first to third embodiments are applied. FIG. 7 is a block diagram that shows the structure of an image processing apparatus according to the present invention.

The fifth embodiment of the present invention relates to a noise reduction apparatus 60 with an image display unit, to which the above-described first to third embodiments are applied. For example, this embodiment is a TV set that receives and displays video signals of, e.g. BS, CS, or terrestrial broadcasting. In FIG. 7, the noise reduction apparatus 60 includes a digital tuner 61 such as a BS digital tuner, a CS digital tuner or a terrestrial digital tuner; an MPEG decoder 62 that receives and decodes MPEG data, which is output from the digital tuner 61; an analog tuner 63 such as a BS analog tuner or a terrestrial analog tuner; a YC separation/video chroma decoder 64 that receives an output from the analog tuner 63, executes a luma/chroma separation process, and decodes a video chroma signal; an external input terminal 65 that receives from outside such motion video signals as a luminance signal Y, a chrominance signal $C_B$, $C_R$, a composite signal, or an RGB signal; and a YC separation/video chroma decoder 66 that processes these motion video signals.

The noise reduction apparatus 60 with the image display unit further includes a selector 67 that receives outputs from the MPEG decoder 62 and YC separation/video chroma decoders 64, 66 and selects one or more of signals in accordance with a control signal from a control unit (not shown) or an operation signal from an operation unit (not shown), and a noise reduction apparatus 1 (or 2, 3) that receives the motion video signal from the selector and executes noise reduction in accordance with the video signal level (image brightness). Furthermore, the noise reduction apparatus 60 with the image display unit includes an IP conversion/scaler unit 68 that receives a noise-free motion video signal from the noise reduction apparatus 1 (or 2, 3), an image quality adjusting unit 69 that is connected to a subsequent stage of the IP conversion/scaler unit 68, and a flat-panel display 70 such as a plasma display or a liquid crystal display.

In the noise reduction apparatus with the image display unit according to the fifth embodiment of the invention, the above-described noise reduction apparatus 1 (or 2, 3) is effectively used. For example, a dark image part is subjected to a high degree of noise reduction using, e.g. a high recursive coefficient S13, and noise-free motion video is displayed on the display 70. On the other hand, a relatively light image part is subjected to a low degree of noise reduction using a low recursive coefficient S13, and motion video with a less conspicuous afterimage is displayed. Thereby, it is possible to provide a noise reduction apparatus with an image display unit, wherein a high-quality image screen, which contains less noise and an inconspicuous afterimage as a whole, is displayed on the flat-panel display 70.

A person skilled in the art may realize the present invention on the basis of the above-described various embodiments, but this invention is not limited to the above embodiments.

What is claimed is:

1. A noise reduction apparatus comprising:
a subtracter that receives an input motion video signal and a motion video signal, which precedes by 1 frame and from which noise is removed, and that obtains a difference signal indicative of a difference between said signals;
a first multiplier that increases/decreases the difference signal in accordance with a value of the motion video signal that is input to the subtracter, thereby obtaining a corrected difference signal;
a motion detection circuit that receives the corrected difference signal from the first multiplier, detects an amount of motion of the motion video signal, and outputs a coefficient varying in accordance with the amount of motion;
a second multiplier that multiplies the difference signal from the subtracter by the coefficient from the motion detection circuit;
an arithmetic unit that subjects the difference signal output from the second multiplier to addition/subtraction with the input motion video signal, thereby outputting a motion video signal, from which a noise component in the input motion video signal is removed; and
a memory unit that receives the noise-free motion video signal from the arithmetic unit, and outputs a motion video signal that delays by 1 frame to the subtracter.

2. The noise reduction apparatus according to claim 1, wherein the first multiplier executes multiplication so as to increase/decrease the difference signal on the basis of any one of the input motion video signal, the 1-frame-preceding motion video signal, and an average value signal that is indicative of an average value between the input motion video signal and the 1-frame-preceding motion video signal.

3. The noise reduction apparatus according to claim 1, wherein the first multiplier finds an absolute value of the difference signal from the subtracter, and increases/decreases the absolute value in accordance with a value of the motion video signal that is input to the subtracter, thereby obtaining a corrected difference signal.

4. The noise reduction apparatus according to claim 1, further comprising a limiter that limits, when a value of the difference signal that is obtained by the subtracter is a predetermined value or more, the difference signal and supplies the limited difference signal to the second multiplier.

5. A noise reduction apparatus comprising:
a subtracter that receives an input motion video signal and a motion video signal, which precedes by 1 frame and from which noise is removed, and that obtains a difference signal indicative of a difference between said signals;

a motion detection circuit that receives the difference signal from the subtracter, detects an amount of motion of the motion video signal, and outputs a coefficient varying in accordance with the amount of motion;

a first multiplier that multiplies the difference signal from the subtracter by the coefficient from the motion detection circuit;

a second multiplier that increases/decreases the difference signal from the first multiplier in accordance with a value of the motion video signal that is input to the subtracter, thereby obtaining a corrected difference signal;

an arithmetic unit that subjects the difference signal output from the second multiplier to addition/subtraction with the input motion video signal, thereby outputting a motion video signal, from which a noise component in the input motion video signal is removed; and a memory unit that receives the noise-free motion video signal from the arithmetic unit, and outputs a motion video signal that delays by 1 frame to the subtracter.

6. The noise reduction apparatus according to claim 5, wherein the second multiplier executes multiplication so as to increase/decrease the difference signal from the first multiplier on the basis of any one of the input motion video signal, the 1-frame-preceding motion video signal, and an average value signal that is indicative of an average value between the input motion video signal and the 1-frame-preceding motion video signal.

7. The noise reduction apparatus according to claim 5, wherein the motion detection circuit outputs the coefficient varying in accordance with the amount of motion, on the basis of an absolute value of the difference signal from the subtracter.

8. The noise reduction apparatus according to claim 5, further comprising a limiter that limits, when a value of the difference signal that is obtained by the subtracter is a predetermined value or more, the difference signal and supplies the limited difference signal to the first multiplier.

\* \* \* \* \*